US010751782B2

(12) United States Patent
Hashimoto et al.

(10) Patent No.: US 10,751,782 B2
(45) Date of Patent: Aug. 25, 2020

(54) METHOD FOR PROCESSING LAMINATED MATERIAL

(71) Applicant: Mitsui High-tec, Inc., Kitakyushu-shi, Fukuoka (JP)

(72) Inventors: Akihiro Hashimoto, Kitakyushu (JP); Tadashi Iida, Kitakyushu (JP); Masahiro Izumi, Kitakyushu (JP)

(73) Assignee: Mitsui High-tec, Inc., Kitakyushu-shi, Fukuoka (JP)

( * ) Notice: Subject to any disclaimer, the term of this patent is extended or adjusted under 35 U.S.C. 154(b) by 309 days.

(21) Appl. No.: 16/064,701

(22) PCT Filed: Jan. 27, 2016

(86) PCT No.: PCT/JP2016/052329
§ 371 (c)(1),
(2) Date: Jun. 21, 2018

(87) PCT Pub. No.: WO2017/130324
PCT Pub. Date: Aug. 3, 2017

(65) Prior Publication Data
US 2019/0009324 A1    Jan. 10, 2019

(51) Int. Cl.
*B21D 39/03* (2006.01)
*H02K 15/02* (2006.01)
(Continued)

(52) U.S. Cl.
CPC .......... *B21D 39/031* (2013.01); *B21D 28/02* (2013.01); *B21D 28/04* (2013.01); *B21D 28/14* (2013.01);
(Continued)

(58) Field of Classification Search
CPC ........ B21D 28/02; B21D 28/04; B21D 28/14; B21D 37/08; B21D 39/031; B21D 39/035; B21D 43/22; H05K 15/031
See application file for complete search history.

(56) References Cited

U.S. PATENT DOCUMENTS 7,667,367 B2 * 2/2010 Matsuo .................. H02K 1/148
310/216.008
2005/0077798 A1 * 4/2005 Mitsui ...................... H02K 1/02
310/216.004
(Continued)

FOREIGN PATENT DOCUMENTS

JP     52-39880 A      3/1977
JP     4-197530 A      7/1992
(Continued)

OTHER PUBLICATIONS

International Search Report dated Mar. 15, 2016, issued in counterpart International Application No. PCT/JP2016/052329 (2 pages).
(Continued)

*Primary Examiner* — Carl J Arbes
(74) *Attorney, Agent, or Firm* — Westerman, Hattori, Daniels & Adrian, LLP

(57) ABSTRACT

At least one caulking group (13) that includes a plurality of caulking parts (14, 15) with different directions is formed on a plurality of thin plates (10) placed in a stacked state to fix the position of the stacked thin plates (10), and then a preset punching process is performed with respect to the thin plates (10) that have been positioned with pilot holes (12). This makes it possible to perform a high-accuracy punching process when punching the plurality of thin plates (10) placed in a stacked state, since positional deviations between the thin plates (10) are avoided and pilot pins (11) are prevented from deforming the periphery of the pilot holes (12).

12 Claims, 4 Drawing Sheets

(51) Int. Cl.
*B21D 37/08* (2006.01)
*B21D 28/02* (2006.01)
*B21D 28/04* (2006.01)
*B21D 28/14* (2006.01)
*B21D 43/22* (2006.01)

(52) U.S. Cl.
CPC ........... *B21D 37/08* (2013.01); *B21D 39/035* (2013.01); *H02K 15/022* (2013.01); *B21D 43/22* (2013.01)

(56) References Cited

U.S. PATENT DOCUMENTS

| | | | | |
|---|---|---|---|---|
| 2006/0108891 | A1* | 5/2006 | Fujita | H02K 15/022 310/216.011 |
| 2008/0282530 | A1* | 11/2008 | Bertocchi | H01F 3/02 29/564.1 |
| 2013/0249346 | A1* | 9/2013 | Nagai | H02K 1/12 310/216.065 |
| 2015/0121686 | A1* | 5/2015 | Shimizu | B21D 28/14 29/598 |
| 2015/0256036 | A1 | 9/2015 | Nakamura | |

FOREIGN PATENT DOCUMENTS

| | | |
|---|---|---|
| JP | 2003-289635 A | 10/2003 |
| JP | 2005-261038 A | 9/2005 |
| JP | 2005-348456 A | 12/2005 |
| JP | 2007-190570 A | 8/2007 |
| JP | 2008-11664 A | 1/2008 |
| JP | 2016-19413 A | 2/2016 |

OTHER PUBLICATIONS

Supplementary European Search Report dated Aug. 19, 2019, issued in counterpart EP Application No. 16 88 7911.2. (2 pages).

\* cited by examiner

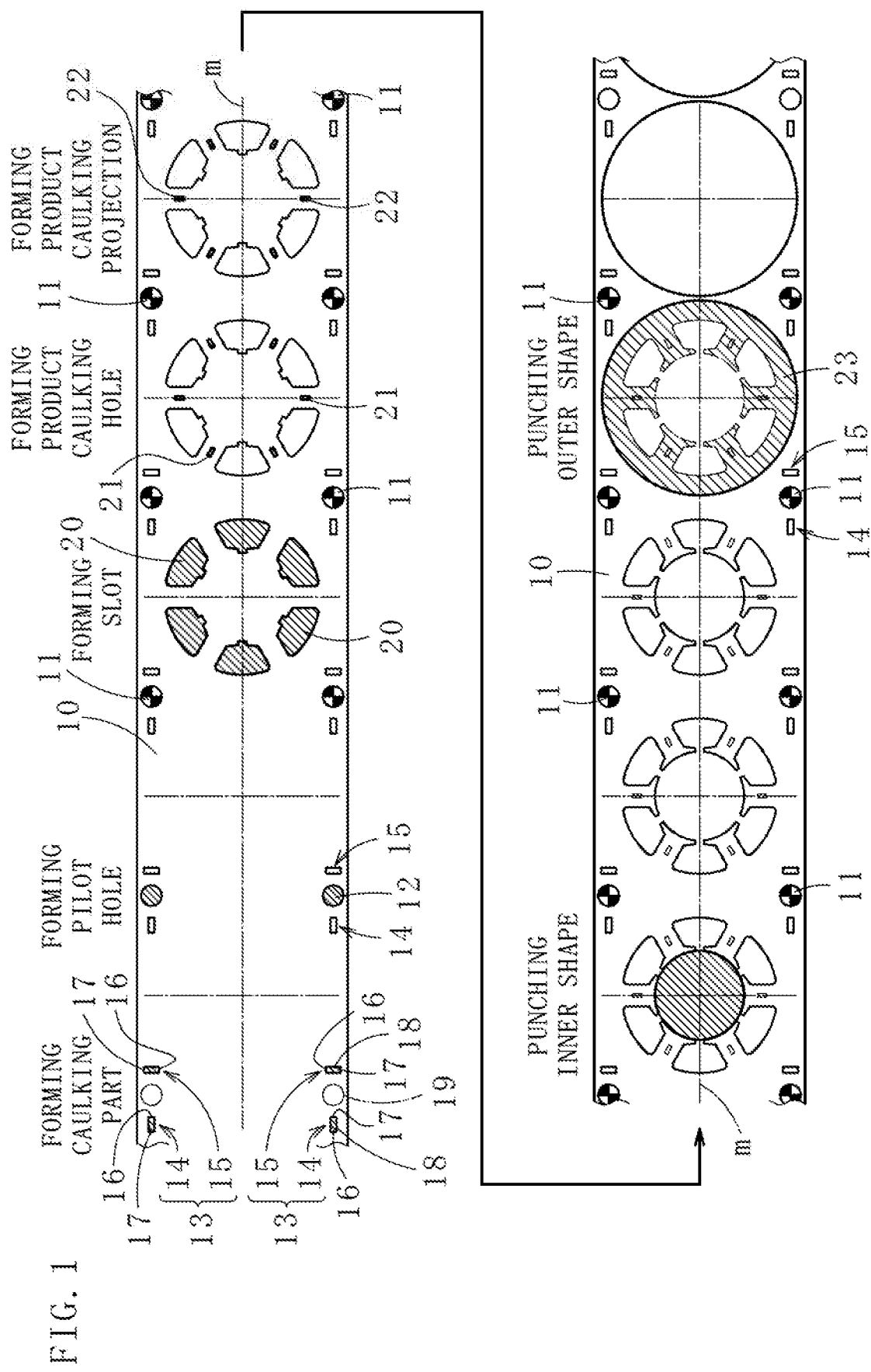

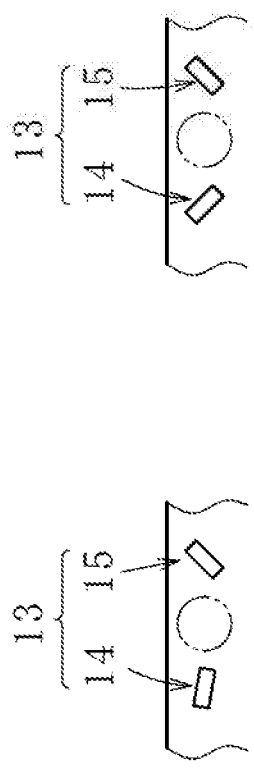
FIG. 2A
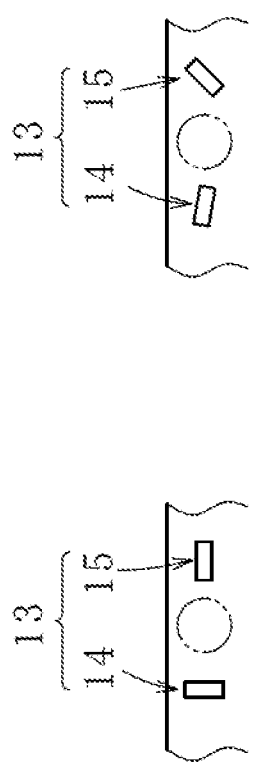
FIG. 2B
FIG. 2C

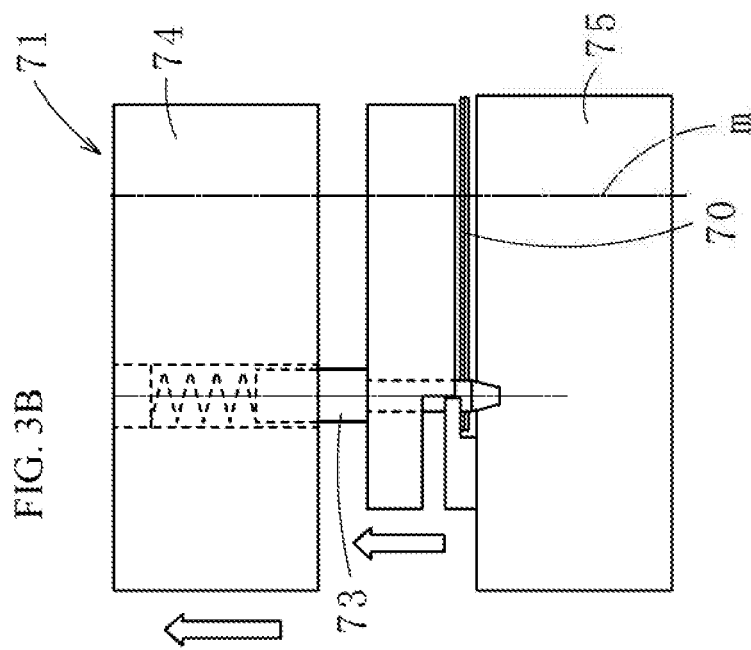
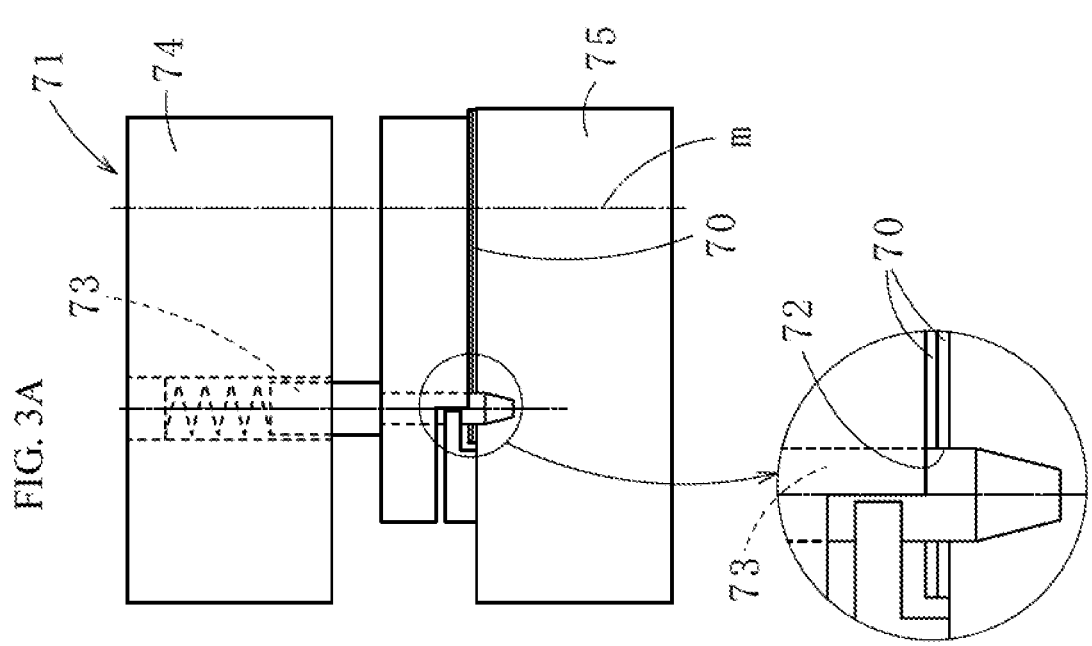

METHOD FOR PROCESSING LAMINATED MATERIAL

TECHNICAL FIELD

The present invention relates to a method for processing a laminated material, performing a punching process on a plurality of thin plates placed in a stacked state.

BACKGROUND ART

For laminated iron core manufacturing, a method of punching a plurality of thin steel sheets (thin plates), which are magnetic steel sheets, while the plurality of thin plates are placed in a stacked state to obtain a laminated iron core is conventionally suggested for the purpose of productivity enhancement.

When, for example, punching two thin plates in a stacked state, the two stacked thin plates are fixed to each other so as not to move, and then sent into a molding device (punching device).
More concretely, the following methods are known: a method to join the thin plates by caulking or spot welding at positions separated by a specified distance from each other in a feeding direction of the stacked thin plates (for example, refer to Patent Literature 1); and a method to integrate the thin plates by welding end faces in one side of the thin plates (for example, refer to Patent Literature 2). Commonly, joining by caulking is widely adopted in view of productivity enhancement and cost reduction of facilities and others.

In a usual case where punching thin plates with a molding device, to precisely place thin plates 70 at a working position in a molding device 71, as shown in FIGS. 3A and 3B, pilot holes 72 are formed through the thin plates 70, pilot pins 73 of the molding device 71 are then inserted into the pilot holes 72 to position the thin plates 70, and hereby a punching process is performed. After the punching process finishes, the pilot pins 73 are pulled from the pilot holes 72 by being raised as an upper die 74 is raised, and then the thin plates 70 are sent to a next punching station. Note that, in FIGS. 3A and 3B, a reference character: 75 represents a lower die where a die is fixed, and a reference character: m represents a center line.

CITATION LIST

Patent Literature

Patent Literature 1: Japanese Unexamined Patent Application Publication No. 52-39880
Patent Literature 2: Japanese Unexamined Patent Application Publication No. 2005-348456

SUMMARY OF INVENTION

Technical Problem

However, when joining end vicinities at both sides in a width direction of the thin plates 70 stacked in two layers with caulking 76 as shown in FIGS. 4A to 4C, positional deviations along a feeding direction of the thin plates 70 can occur depending on the forming positions or the shape of the caulking 76, and these positional deviations result in positional deviations between centers of pilot holes 72 formed respectively in the two thin plates 70.

As a result, deformations on the periphery of the pilot holes 72 can emerge as a problem when inserting the pilot pins 73 into the pilot holes 72 for positioning, and also when pulling the pilot pins 73 from the pilot holes 72 if the pilot pins 73 have to be tugged as the pilot pins 73 cannot be easily removed.

These deformations on the periphery of the pilot holes 72 cause a problem in that the accuracy of positioning with the pilot holes 72 seriously degrades in subsequent processes.

The present invention has been made in consideration of the above circumstances, and has as its object to provide a method for processing a laminated material that enables a high-accuracy punching process by avoiding positional deviations between a plurality of thin plates placed in a stacked state to prevent pilot pins from deforming the periphery of pilot holes when performing a punching process on the thin plates.

Solution to Problem

In order to achieve the above object, a method for processing a laminated material according to the present invention comprises:
fixing a position of a plurality of thin plates placed in a stacked state by forming at least one caulking group having a plurality of caulking parts with different directions in planar view on the stacked thin plates; and
performing a preset punching process with respect to the thin plates positioned with pilot holes after fixing the position of the thin plates.

In the method for processing a laminated material according to the present invention, it is preferable to form the caulking group on each of both sides in a width direction of the thin plates, and besides, to form each of the pilot holes in between the caulking parts lying next to each other to become each of the caulking groups.

Here, it is preferred that the caulking groups on both sides in the width direction of the thin plates be arranged in symmetrical positions with respect to a center in the width direction of the thin plates.

In the method for processing a laminated material according to the present invention, it is preferable that the caulking group be formed additionally in a central part in the width direction of the thin plates. Here, a central part in the width direction of the thin plates does not mean only an absolute center in the width direction. It is enough to be an approximately central part (a part except for both ends in the width direction).

Here, it is preferred that the caulking group in the central part in the width direction of the thin plates be formed in an area that is discarded by the punching process or an area that becomes a residual material after the punching process.

In a method for processing a laminated material according to the present invention, it is preferred that each of the caulking groups comprise a pair of the caulking parts, and one of the pair of the caulking parts be oriented in a direction along a feeding direction of the thin plates, and the other be oriented in a direction orthogonal to the feeding direction of the thin plates.

In a method for processing a laminated material according to the present invention, it is preferred that each of the caulking parts be formed into a rectangle shape in planar view, and one of the opposing short sides of the rectangular caulking part be disconnected from the thin plates and the other be bent with respect to the thin plates.

Advantageous Effects of Invention

In the method for processing a laminated material according to the present invention, the position of the plurality of thin plates placed in a stacked state can be fixed, since the caulking groups each including the plurality of caulking parts with different directions are formed on the stacked thin plates. Consequently, no positional deviations between the thin plates occur, and thus, centers of the pilot holes formed respectively in each of the thin plates always coincide with each other.

Therefore, when the pilot pins are inserted into the pilot holes or the pilot pins are pulled from the pilot holes, no pilot pins deform the periphery of the pilot holes, and the accuracy of the positioning with the pilot holes becomes high. This makes it possible to precisely punch the thin plates.

In addition, in the case of forming the caulking group additionally in the central part in the width direction of the thin plates, positional deviations are prevented even in, for example, a case of wide thin plates having a tendency to have positional deviations when stacked in layers.

Besides, there is no need to obtain an additional space for forming the caulking group as long as the caulking group, which is in the central part in the width direction of the thin plates, is formed in the area that is discarded by the punching process or the area that becomes a residual material after the punching process.

BRIEF DESCRIPTION OF DRAWINGS

FIG. 1 is a diagram for explaining a method for processing a laminated material according to an embodiment of the present invention.

FIGS. 2A to 2C are diagrams for explaining the caulking parts each relating to modifications.

FIG. 3A is a diagram showing a situation where one of the pilot pins has been inserted into one of the pilot holes, and 3B is a diagram showing a situation where the pilot pin is being pulled from the pilot hole.

DESCRIPTION OF EMBODIMENTS

Figure 4A:
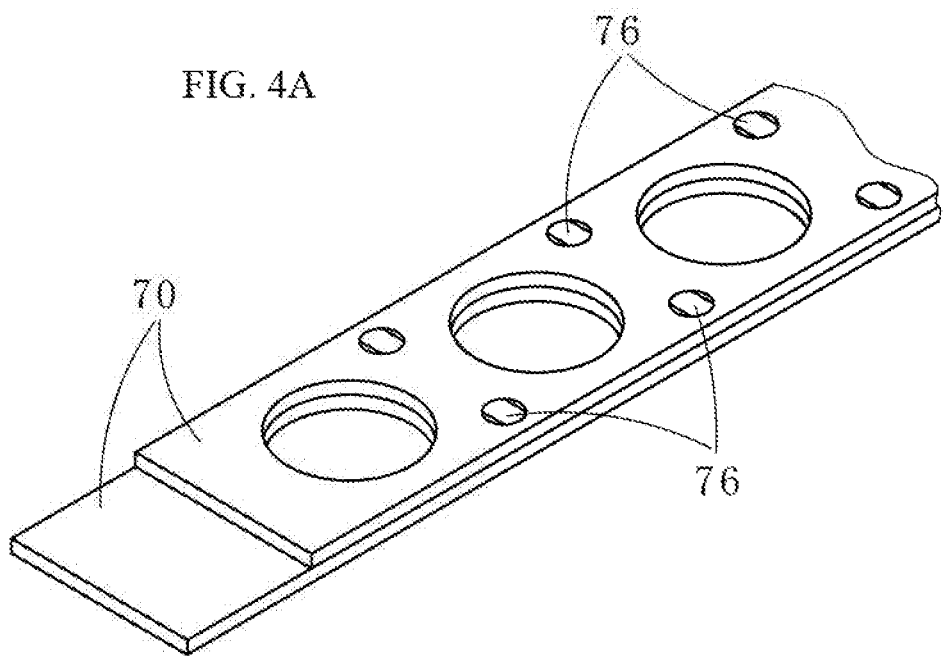
FIG. 4A is an oblique perspective figure showing a jointed state of the two thin plates placed in a stacked state, 4B is a plan view of the caulking in the jointed part, and 4C is a sectional side view of 4B.
Figure 4B:
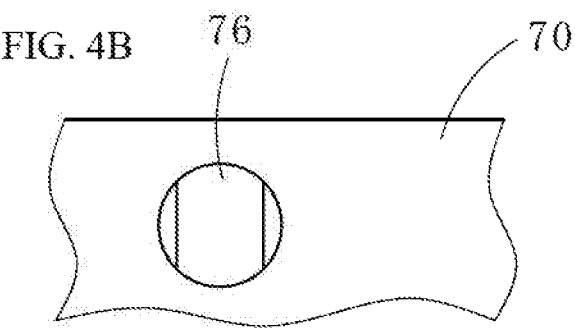
Figure 4C:
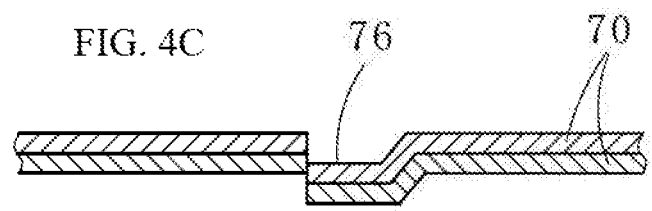

Embodiments of the present invention will be described next with reference to the accompanying drawings to provide an understanding of the present invention.

A method for processing a laminated material according to one embodiment of the present invention is, as shown in FIG. 1, a method that enables a high-accuracy punching process when punching a plurality of thin plates 10 placed in a stacked state (forming a laminated material) by avoiding positional deviations between the plurality of thin plates 10 to prevent pilot pins 11 from deforming the periphery of pilot holes 12 for use in positioning.

Hereinafter, a case of applying a method for processing a laminated material according to the embodiment to laminated iron core manufacturing will be described. Incidentally, the laminated iron core may be a rotor or a stator.

Here, each of the thin plates 10 for use in the laminated iron core manufacturing is a strip material made of an electromagnetic steel sheet having a thickness of, for example, approximately 0.10 mm to 0.5 mm (in this case, 0.25 mm). Although the thin plates 10 are stacked in two layers, the thin plates may be stacked in, for example, three or more layers depending on the thickness of each of the thin plates (if thin).

First, a caulking part forming step will be explained.

In this step, caulking groups 13 are formed on the plurality of thin plates 10 placed in a stacked state.

Each of the caulking groups 13 is composed of a pair of caulking parts 14 and 15. Although the caulking parts 14 and 15 are formed by a cutting and bending (also referred to as one-side cutting or one-side bending) process, conventionally used various shapes are also applicable, such as trapezoidal, V-shaped, round-flat, or else. Incidentally, the cutting and bending process is a process for forming a caulking part in a rectangle shape in planar view, and one side 16 of the opposing short sides of the rectangular caulking part is disconnected from the thin plates 10 and the other side 17 is bent with respect to the thin plates 10. The inclination angle of the bending is, for example, 20 degrees to 45 degrees with respect to the surface of the thin plates 10.

The caulking parts 14 and 15 forming a pair differ in direction.

Here, to differ in direction means that respective directions of long sides 18 of the caulking parts 14 and 15 are different (in directions crossing each other) in planar view.

Generally speaking of caulking parts, a caulking part formed on one of stacked thin plates sticks out toward another one of the thin plates and fixes the thin plates so as not to move. However, when there is one caulking part formed, positional deviations between the thin plates along the direction of the caulking part are likely to occur.

Therefore, by making the caulking parts' directions different as described above, the position of the stacked thin plates 10 is fixed (no positional deviations occur) due to a synergetic effect between the caulking parts 14 and 15.

The caulking groups 13 each consisting of a pair (a set) of the caulking parts 14 and 15 are formed on both sides in a width direction of the thin plates 10. Although the caulking groups 13 are arranged at symmetrical positions with respect to a center in the width direction of the thin plates 10 (a center line m), the caulking groups 13 may be arranged at asymmetrical positions.

In particular, here, each of predetermined forming positions 19 for pilot holes 12, which are formed during a pilot hole forming step described below, is set in between the caulking parts 14 and 15 lying next to each other to become each one of the caulking groups 13. This makes it possible to more effectively prevent positional deviations between the centers of the corresponding pilot holes 12 formed in each of the two thin plates 10.

Incidentally, regarding respective positions of the caulking parts 14 and 15 forming each pair with respect to each corresponding one of the pilot holes 12 (the predetermined forming positions 19), the caulking part 14 is on the upstream side in a feeding direction of the thin plates 10, and the caulking part 15 is on the downstream side in the feeding direction of the thin plates 10.

Further, the caulking part 14 (the direction of the long side 18) is oriented in a direction along the feeding direction of the thin plates 10 (a length direction of the thin plates 10), and the caulking part 15 is oriented in a direction orthogonal to the feeding direction of the thin plates 10 (along the width direction of the thin plates 10).

Furthermore, regarding two of the caulking parts 14 formed respectively on both sides in the width direction of the thin plates, the positions of the one sides 16 (disconnected sides) and the other sides 17 (bent sides) of the short sides opposing each other in the feeding direction of the thin plates 10 are reversed (the positions of the disconnected sides and the bent sides are respectively different), however, the positions may be the same.

Also, regarding two of the caulking parts 15 formed respectively on both sides in the width direction of the thin plates, the positions of the one sides 16 and the other sides 17 of the short sides opposing each other in the width direction of the thin plates 10 are reversed, however, the positions may be the same.

Note that, the caulking parts 14 and 15 constituting the caulking groups 13 are not limited to the above structure. They may be configured, for example, as shown in FIGS. 2A to 2C.

Regarding two pairs of the caulking parts 14 and 15 shown in FIG. 2A, each of the caulking parts 14 is oriented in a direction along the width direction of the thin plates 10, and each of the caulking parts 15 is oriented in a direction along the feeding direction of the thin plates 10 (a reversed version of the positions of each pair of the caulking parts 14 and 15 shown in FIG. 1). Incidentally, the two pairs of the caulking parts 14 and 15 (i.e. the caulking groups 13) are arranged in symmetrical positions with respect to the center line m of the width direction of the thin plates 10.

Further, regarding two pairs of the caulking parts 14 and 15 shown in FIG. 2B, the direction of each of the caulking parts 14 is inclined with respect to the feeding direction of the thin plates 10, and the direction of each of the caulking parts 15 is inclined with respect to the width direction of the thin plates 10. Incidentally, the two pairs of the caulking parts 14 and 15 (i.e. the caulking groups 13) are arranged in symmetrical positions with respect to the center line m of the width direction of the thin plates 10.

In addition, the inclination angle of the caulking part 14 shown in FIG. 2C is larger than that of the caulking part 14 shown in FIG. 2B. Incidentally, the two pairs of the caulking parts 14 and 15 (i.e. the caulking groups 13) are arranged in asymmetrical positions with respect to the center line of the width direction of the thin plates 10.

Furthermore, the caulking group described above may also be formed additionally in the central part in the width direction of the thin plates. This makes it possible to more effectively prevent positional deviations regarding wide thin plates (for example, having a width of 50 cm or more, or moreover, 100 cm or more).

In a case of forming the caulking group in the central part in the width direction of the thin plates as stated above, it is preferable to form the caulking group in the area that is discarded by the below mentioned punching process (a scrap area) or the area that becomes a residual material after the punching process (a residual material area). This makes it possible to use up the thin plates without waste, since there is no need to obtain an additional space for forming the caulking groups.

After forming the caulking parts 14 and 15 by the above stated methods on the plurality of thin plates 10 in a stacked state, the thin plates 10 are sent to the pilot hole forming step as shown in FIG. 1.

In this step, the pilot holes 12 are formed at the predetermined forming positions 19 for the pilot holes 12 while the plurality of thin plates 10 are fixed to each other with the caulking parts 14 and 15.

A molding device not shown in the figure then performs a preset punching process described below with respect to the thin plates 10 that have been positioned with the pilot holes 12 while repeatedly inserting the pilot pins 11 into the pilot holes 12, and pulling the pilot pins 11 from the pilot holes 12.

First, in a slot forming step, slots 20 are formed (punched). Next, in a product caulking hole forming step, caulking holes 21 are formed (punched). Here, in a case where the caulking holes 21 are not formed, caulking projections 22 are formed in a product caulking projection forming step. Then, after punching inner shape in an inner shape punching step, iron core pieces 23 are punched in an outer shape punching step, and a laminated iron core is configured by stacking the obtained iron core pieces 23 in a plurality of layers.

Incidentally, when forming the caulking group in the central part in the width direction of the thin plates, it is preferable that the caulking group be formed in an area where the slots are formed or an area where the inner shape is punched respectively described above. However, in a case of forming the caulking group in the area that is discarded by the punching process (the scrap area), positional deviations can occur between the stacked thin plates in subsequent steps after the punching areas are punched. In this case, it is possible to surely prevent positional deviations between the thin plates until the outer shape punching step finishes by forming the caulking group near the center (in the approximately central part) in the width direction of the thin plates, and additionally, in an area that remains as a part of the thin plates after the outer shape punching step finishes (i.e. the area that becomes a residual material after the punching process).

This makes it possible to prevent positional deviations between the centers of the corresponding pilot holes 12 formed in each of the plurality of thin plates 10, and also prevent deformations of the pilot holes 12 when the pilot pins 11 are inserted into the pilot holes 12 and when the pilot pins 11 are pulled from the pilot holes 12.

Consequently, the accuracy of the positioning with the pilot holes 12 becomes high and this makes it possible to precisely punch the thin plates 10.

The present invention has been described above with reference to the embodiment. However, the present invention is not limited to the structures described in the above embodiment, and includes other embodiments and modifications conceivable within the scope of the matters described in the scope of the claims. For instance, cases where a part/parts of or the entirety of the respective embodiments and modifications described above are combined to configure a method for processing a laminated material according to the present invention are also included within the scope of rights of the present invention.

For example, a case of processing a laminated iron core by using a method for processing a laminated material according to the present invention is explained in the above embodiment. However, the present invention is not limited by this case, but is applicable in any cases of punching a plurality of thin plates placed in a stacked state with a molding device. Here, the number of layers, the thickness, the width, and other conditions about the thin plates are variously alterable depending on the intended use.

Also, a case of performing the caulking part forming step and the pilot hole forming step in a sequential order while the plurality of thin plates are placed in a stacked state is explained in the embodiment. However, the caulking part forming step may be performed at the same time as the pilot hole forming step, and also, may be performed after (immediately after) the pilot hole forming step has been performed.

In addition, a case where each of the caulking groups comprises a pair of the caulking parts is explained in the embodiment. However, each of the caulking groups may comprise three or more of the caulking parts. In this case, it is enough that the directions of at least two of the caulking parts are different. (There is no problem if the directions of all the caulking parts are different).

INDUSTRIAL APPLICABILITY

The caulking groups each including the caulking parts with different directions are formed on the plurality of thin plates placed in a stacked state to fix the position of the thin plates, and after that, the punching process is performed with respect to the thin plates that have been positioned with the pilot holes. This makes it possible to avoid problems such as positional deviations between the thin plates stacked in layers, and obtain a precise laminated material (a rotor or a stator).

REFERENCE SIGNS LIST

10: thin plate, 11: pilot pin, 12: pilot hole, 13: caulking group, 14, 15: caulking part, 16: one side, 17: other side, 18: long side, 19: predetermined forming position, 20: slot, 21: caulking hole, 22: caulking projection, 23: iron core piece

The invention claimed is:

1. A method for processing a laminated material comprising:
   fixing a position of a plurality of thin plates placed in a stacked state by forming at least one caulking group having a plurality of caulking parts with different directions in planar view on the stacked thin plates; and
   performing a preset punching process with respect to the thin plates positioned with pilot holes after fixing the position of the thin plates.

2. The method for processing a laminated material according to claim 1, wherein
   the caulking group is formed on each of both sides in a width direction of the thin plates; and
   each of the pilot holes is formed in between the caulking parts lying next to each other to become each of the caulking groups.

3. The method for processing a laminated material according to claim 2, wherein the caulking groups on both sides in the width direction of the thin plates are arranged in symmetrical positions with respect to a center in the width direction of the thin plates.

4. The method for processing a laminated material according to claim 2, wherein the caulking group is formed additionally in a central part in the width direction of the thin plates.

5. The method for processing a laminated material according to claim 3, wherein the caulking group is formed additionally in a central part in the width direction of the thin plates.

6. The method for processing a laminated material according to claim 4, wherein the caulking group in the central part in the width direction of the thin plates is formed in an area that is discarded by the punching process or an area that becomes a residual material after the punching process.

7. The method for processing a laminated material according to claim 5, wherein the caulking group in the central part in the width direction of the thin plates is formed in an area that is discarded by the punching process or an area that becomes a residual material after the punching process.

8. The method for processing a laminated material according to claim 1, wherein each of the caulking groups comprises a pair of the caulking parts, one of the pair of the caulking parts being oriented in a direction along a feeding direction of the thin plates, the other being oriented in a direction orthogonal to the feeding direction of the thin plates.

9. The method for processing a laminated material according to claim 2, wherein each of the caulking groups comprises a pair of the caulking parts, one of the pair of the caulking parts being oriented in a direction along the feeding direction of the thin plates, the other being oriented in a direction orthogonal to the feeding direction of the thin plates.

10. The method for processing a laminated material according to claim 3, wherein each of the caulking groups comprises a pair of the caulking parts, one of the pair of the caulking parts being oriented in a direction along the feeding direction of the thin plates, the other being oriented in a direction orthogonal to the feeding direction of the thin plates.

11. The method for processing a laminated material according to claim 1, wherein each of the caulking parts is formed into a rectangle shape in planar view, and one of the opposing short sides of the rectangular caulking part is disconnected from the thin plates and the other is bent with respect to the thin plates.

12. The method for processing a laminated material according to claim 2, wherein each of the caulking parts is formed into a rectangle shape in planar view, and one of the opposing short sides of the rectangular caulking part is disconnected from the thin plates and the other is bent with respect to the thin plates.

* * * * *